United States Patent [19]

Cabeza

[11] Patent Number: 4,545,594
[45] Date of Patent: Oct. 8, 1985

[54] BALL RACE FOR BICYCLE HEADSET

[76] Inventor: Maximino R. Cabeza, Calle Central 709, Miramar, Santurce, P.R. 00907

[21] Appl. No.: 514,019

[22] Filed: Jul. 15, 1983

[51] Int. Cl.$^4$ .............................................. B62K 21/18
[52] U.S. Cl. ..................................... 280/279; 403/370
[58] Field of Search .................... 280/279, 280, 274; 403/20, 370, 371, 374, 377; 384/513, 514

[56] References Cited

U.S. PATENT DOCUMENTS 4,340,238 7/1982 Cabeza ................................. 280/279
4,436,468 3/1984 Ozaki et al. ......................... 280/279

FOREIGN PATENT DOCUMENTS 63610 9/1949 Netherlands ........................ 280/279

*Primary Examiner*—Joseph F. Peters, Jr.
*Assistant Examiner*—Donn McGiehan
*Attorney, Agent, or Firm*—Scrivener Clarke Scrivener and Johnson

[57] ABSTRACT

An improved upper member for the two-part ball race of a bicycle headset is provided which is light in weight and has a ball engaging surface which follows closely the contours of the balls.

1 Claim, 4 Drawing Figures

U.S. Patent  Oct. 8, 1985  4,545,594
PRIOR ART
FIG. 1.
PRIOR ART
FIG. 2.
FIG. 3.
FIG. 4.
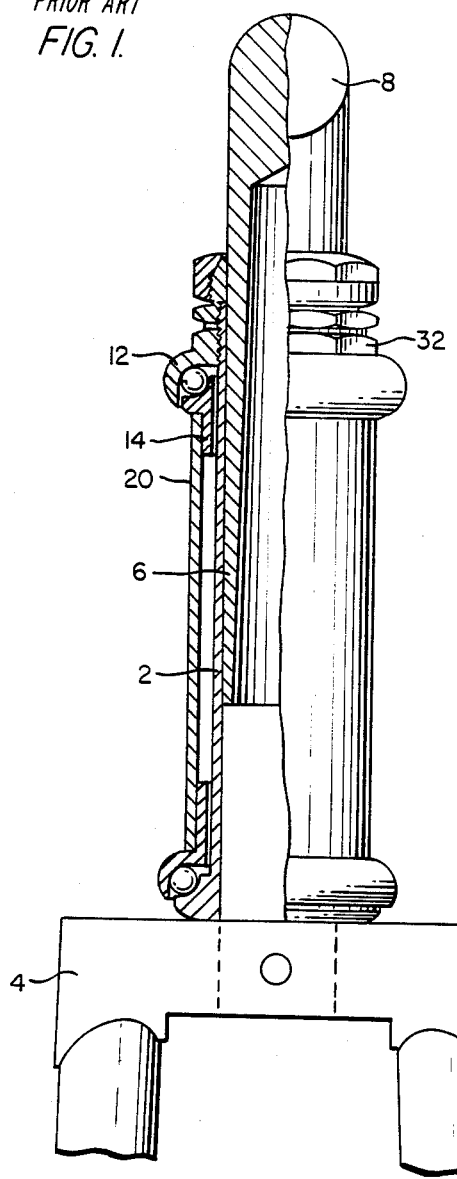
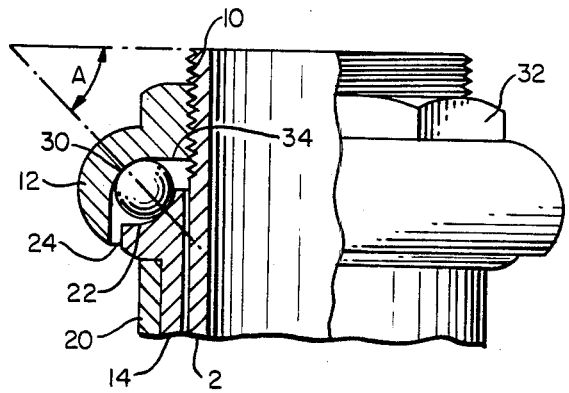
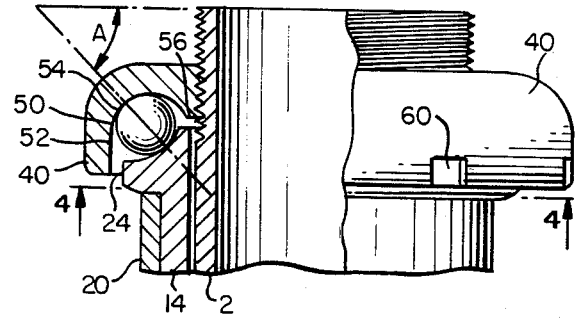
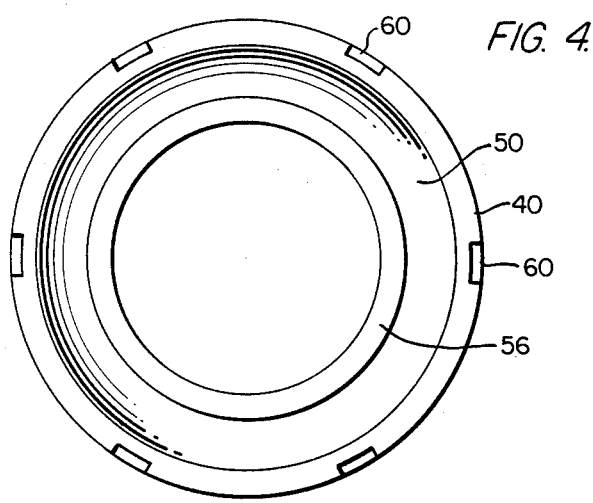

BALL RACE FOR BICYCLE HEADSET

SUMMARY OF THE INVENTION

The ball race of a bicycle headset has an improved upper race member which incorporates new means for turning the member thus eliminating material and making the member lighter in weight, and which also has an improved inner ball engaging configuration.

BACKGROUND OF THE INVENTION

In FIG. 1 of the drawings there is shown parts of the improved headset for bicycles which is described and claimed in my U.S. Pat. No. 4,341,394, issued July 27, 1982 for Simultaneous Connection Between Handlebar and Steering Fork of Bicycle. This headset comprises the hollow cylindrical tube 2 which extends upwardly from the steering fork 4 of the front wheels and receives within it the cylindrical stem 6 which extends downwardly from the handlebars 8. At its upper end part the fork tube is provided with an external screw thread 10 by which it is connected to the upper member 12 of an annular ball bearing race, the lower member of which is shown at 14. The lower member 14 is connected to the cylindrical bicycle frame part 20 which surrounds the fork stem 2, and has an annular, upwardly facing radially outwardly inclined concave surface 22 on which the balls are supported and which is tangential to the balls at their contacting surfaces, and also has an annular axial edge surface 24. The ball race is completed by upper member 12 the inner surface of which provides an annular downwardly facing concave surface 30 which is above the balls and is positioned to permit their free movement in the two-part ball race. Surmounting the upper race member and formed integrally with it is an upwardly projecting part 32 having a preferably octagonal peripheral surface which is adapted and intended to be engaged by a tool for turning and adjusting the upper race member with respect to the fork tube 2.

The ball engaging surface 30 of the conventional upper race member engages the balls at a point in a line connecting the points of tangency of the upper and lower race members which makes angle A with the horizontal, as shown in FIG. 2, and from this point the inner surface of the upper race member extends radially inwardly, as shown at 34 without further curvature toward the balls.

The object of the invention has been to provide in the ball race of a bicycle headset an upper member of improved construction and configuration which is lighter in weight than the upper member of conventional headsets, and which provides improved movement of the balls.

BRIEF DESCRIPTION OF THE DRAWINGS

FIG. 1 is a part elevational and part sectional view of the headset of a bicycle according to the invention of my patent which is referred to above;

FIG. 2 is an enlarged part elevational and part sectional view of the conventional ball race and associated parts shown in FIG. 1;

FIG. 3 is a view similar to FIG. 2 showing the upper ball race member provided by the invention, and FIG. 4 is a view taken on line 4—4 of FIG. 3.

DESCRIPTION OF THE PREFERRED EMBODIMENT OF THE INVENTION

The ball race provided by the invention is disclosed in FIGS. 3 and 4 and comprises, first, the lower race member 14 which is of conventional construction and configuration. In the preferred embodiment of the invention the upper member of the ball race is annular in configuration and surrounds and is screw threaded to the upper end of the steering fork tube 2 and at its outer periphery is provided with a downwardly extending skirt 40 the outer peripheral edge of which is positioned adjacent the axial annular edge surface 24 of the lower race member 14 and extends below the outer periphery of its ball receiving surface.

The inner surface 50 of the upper ball race member comprises an outer substantially vertical part 52 which forms the inner surface of the skirt 40. Adjacent the upper surface of 52 this surface turns inwardly as shown at 54 and follows the configuration of the upper surfaces of the balls to an annular edge just inboard of the balls, where it terminates and joins a flat horizontal surface 56 which extends inwardly to the fork tube. The points of contact of the balls with the upper and lower race members is shown in FIG. 3 as lying on a line making angle A with the horizontal, which angle is the same as that of the conventional headset.

In further accordance with the invention the upwardly extending tool engaging part 32 of the conventional upper race member is eliminated and means are provided on the exterior of the depending skirt 40 for engagement by a tool for turning the upper race member with respect to the fork tube 2. In the preferred embodiment being described these means take the form of a plurality of recesses or slots 60 which are arranged in spaced relation about the skirt.

It will be seen from an inspection of FIG. 2 that elimination of the tool engaging part 32 reduces materially the area of the threaded connection between the upper race member and the fork tube 2, with resulting weakening of the strength and stability of the headset. This adverse effect is eliminated, however, by the increase in the area of the threaded connection caused by the configuration of the inner surface of the upper race member as described above and as clearly shown by a comparison of FIGS. 2 and 3.

I claim:

1. A circular ball bearing race for a bicycle headset, comprising upper and lower race members having, respectively, downwardly and upwardly facing annular arcuate surfaces defining a race for receiving a plurality of balls, the configurations of the balls engaging surfaces of the upper and lower race members being such that the centers of the areas of tangency of the surfaces with the balls are in a line which makes an acute angle with the horizontal, (a) the upper race member comprising:
      i. an outer depending annular skirt the lower edge of which is below the lower edge of the arcuate surface of the lower race member,
      ii. a substantially horizontal part extending inwardly from the upper part of the skirt and having a horizontal, flat upper surface,
      iii. a vertical screw-threaded surface adapted to be connected to the fork stem of the bicycle and extending vertically downwardly from the inner end of said flat upper surface, iv. an inner surface which extends from its contact with the balls toward the fork tube and downwardly in a curve which follows the configuration of the upper surfaces of the balls to a point between the centers of the balls and the lower end of the threaded surface where it forms an edge with a short horizontal surface extending to the lower end of the threaded surface, and v. a plurality of spaced slots formed in the outer surface of the skirt for engagement by a tool to permit adjustment and retention of the position of the upper race member on the threaded surface.

* * * * *